(12) United States Patent
Murayama

(10) Patent No.: US 11,248,302 B2
(45) Date of Patent: Feb. 15, 2022

(54) ELECTROLYTIC DEVICE AND ELECTROLYSIS METHOD

(71) Applicant: KABUSHIKI KAISHA TOSHIBA, Tokyo (JP)

(72) Inventor: Hirotoshi Murayama, Yokohama (JP)

(73) Assignee: KABUSHIKI KAISHA TOSHIBA, Tokyo (JP)

(*) Notice: Subject to any disclaimer, the term of this patent is extended or adjusted under 35 U.S.C. 154(b) by 0 days.

(21) Appl. No.: 17/097,014

(22) Filed: Nov. 13, 2020

(65) Prior Publication Data

US 2021/0198794 A1   Jul. 1, 2021

(30) Foreign Application Priority Data

Dec. 25, 2019   (JP) .............................. JP2019-234883

(51) Int. Cl.
```
C25B 11/03      (2021.01)
C25B 1/04       (2021.01)
C25B 9/73       (2021.01)
C25B 9/19       (2021.01)
C25B 3/03       (2021.01)
```
(52) U.S. Cl.
CPC ................ *C25B 11/03* (2013.01); *C25B 1/04* (2013.01); *C25B 3/03* (2021.01); *C25B 9/19* (2021.01); *C25B 9/73* (2021.01)

(58) Field of Classification Search
CPC ......... C25B 1/04; C25B 11/031; C25B 11/03; C25B 11/032
See application file for complete search history.

(56) References Cited

U.S. PATENT DOCUMENTS

| | | |
|---|---|---|
| 2004/0245104 A1 | 12/2004 | Aikawa et al. |
| 2016/0002798 A1 | 1/2016 | Rømer et al. |
| 2016/0215402 A1* | 7/2016 | Takahashi ............... C02F 1/461 |
| 2017/0130344 A1 | 5/2017 | Mitsushima et al. |
| 2019/0145012 A1 | 5/2019 | Murayama |
| 2020/0283916 A1* | 9/2020 | Murayama .............. C25B 13/02 |

FOREIGN PATENT DOCUMENTS

| | | |
|---|---|---|
| EP | 2 876 090 A1 | 5/2015 |
| JP | 2004-300553 A | 10/2004 |
| JP | 2015-009175 A | 1/2015 |
| JP | 2016-509634 A | 3/2016 |
| JP | 2019-090087 A | 6/2019 |
| WO | WO 2015/146944 A1 | 10/2015 |

* cited by examiner

*Primary Examiner* — Brian W Cohen
(74) *Attorney, Agent, or Firm* — Oblon, McClelland, Maier & Neustadt, L.L.P.

(57) ABSTRACT

An electrolytic device includes a first electrode, a second electrode, and a diaphragm provided between the first electrode and the second electrode. A first flow channel is formed inside the first electrode and discharges a first raw material in liquid form toward the diaphragm.

12 Claims, 11 Drawing Sheets

ELECTROLYTIC DEVICE AND ELECTROLYSIS METHOD

CROSS-REFERENCE TO RELATED APPLICATIONS

This application is based upon and claims the benefit of priority from Japanese Patent Application No. 2019-234883, filed on Dec. 25, 2019; the entire contents of which are incorporated herein by reference.

FIELD

Embodiments relate to an electrolytic device and an electrolysis method.

BACKGROUND

In a known electrolytic device, a desired substance is produced from a raw material by utilizing an electrolysis reaction. It is desirable to increase the efficiency of such an electrolytic device.

DETAILED DESCRIPTION

An electrolytic device according to an embodiment includes a first electrode, a second electrode, and a diaphragm provided between the first electrode and the second electrode. A first flow channel is formed inside the first electrode and discharges a first raw material in liquid form toward the diaphragm.

An electrolysis method according to an embodiment uses an electrolytic device. The electrolytic device includes a first electrode, a second electrode, and a diaphragm provided between the first electrode and the second electrode, a first flow channel being formed inside the first electrode and discharging a first raw material toward the diaphragm, the first raw material being a liquid, a second raw material being a liquid and being supplied to the diaphragm from the second electrode side. The method includes using electrolysis to produce a first product from the first raw material and produce a second product from the second raw material.

First Embodiment

First, a first embodiment will be described.

Figure 1:
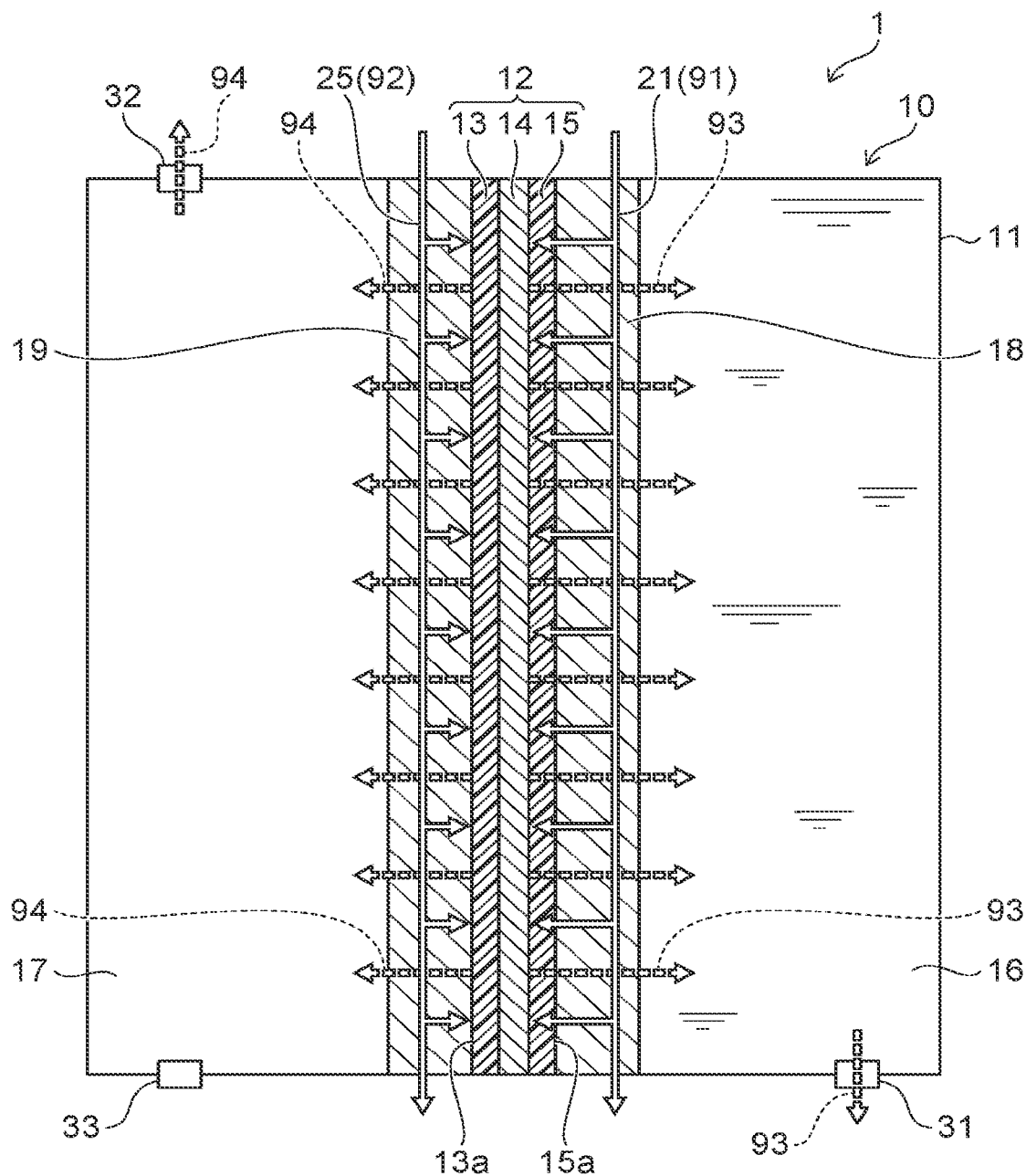
FIG. 1 shows an electrolytic device according to a first embodiment.

FIG. 1 shows an electrolytic device according to the embodiment.

Figure 2:
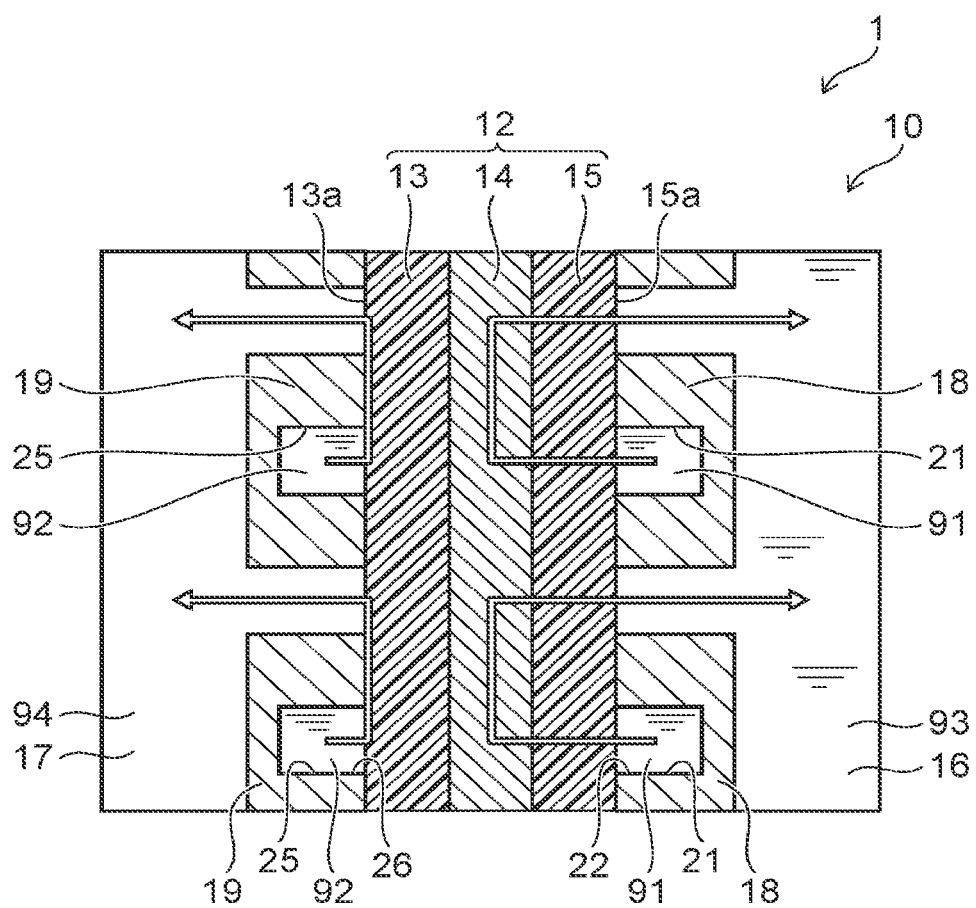
FIG. 2 is a partially enlarged cross-sectional view showing a diaphragm vicinity of the electrolytic device according to the first embodiment.

FIG. 2 is a partially enlarged cross-sectional view showing a diaphragm vicinity of the electrolytic device according to the embodiment.

Figure 3:
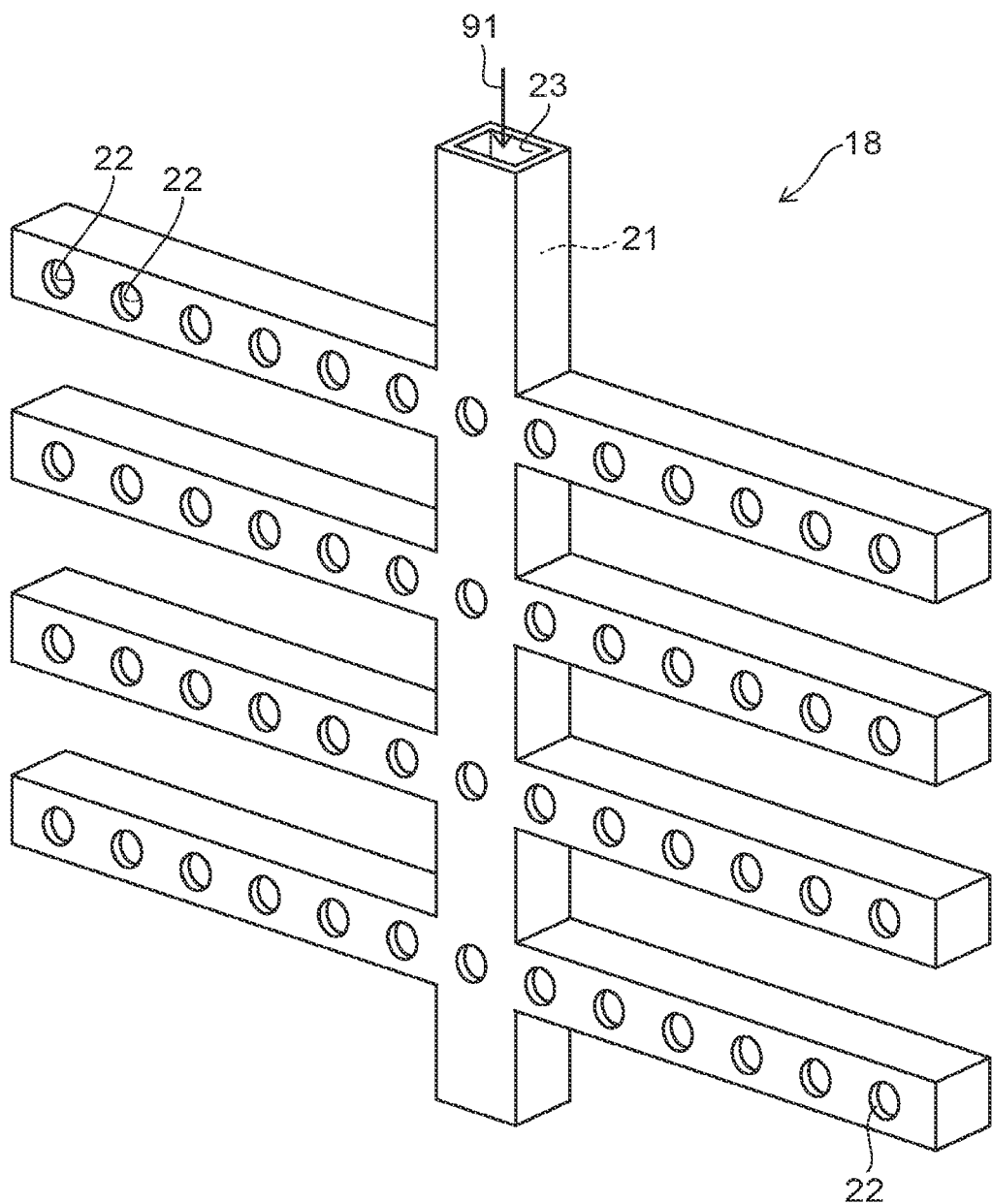
FIG. 3 is a perspective view showing an electrode of the electrolytic device according to the first embodiment.

FIG. 3 is a perspective view showing an electrode of the electrolytic device according to the embodiment.

As shown in FIGS. 1 to 3, an electrolytic cell 10 is provided in the electrolytic device 1 according to the embodiment. A housing 11 is provided in the electrolytic cell 10. An isolation structure body 12 is provided inside the housing 11. A diaphragm 13, a catalyst layer 14, and a diffusion layer 15 are stacked in this order in the isolation structure body 12. In other words, the catalyst layer 14 is located between the diaphragm 13 and the diffusion layer 15.

The diaphragm 13 is, for example, an ion exchange membrane. In the embodiment, the diaphragm 13 is a positive ion exchange membrane; positive ions can pass, but negative ions and molecules substantially cannot pass. The catalyst layer 14 is made of a material that promotes a designated chemical reaction. In the embodiment, as described below, the catalyst layer 14 promotes the reaction of changing toluene into methylcyclohexane. For example, the catalyst layer 14 is formed of platinum (Pt). The diffusion layer 15 is a layer that transmits a liquid while diffusing the liquid. For example, the diffusion layer 15 is formed of carbon paper.

The interior of the housing 11 is divided into a negative-side cell 16 and a positive-side cell 17 by the diaphragm 13. A negative electrode 18 is provided inside the negative-side cell 16. The negative electrode 18 contacts the diffusion layer 15. However, the negative electrode 18 does not cover the entire surface 15a of the diffusion layer 15 at the side opposite to the catalyst layer 14. Therefore, a portion of the surface 15a of the diffusion layer 15 is exposed inside the negative-side cell 16.

On the other hand, a positive electrode 19 is provided inside the positive-side cell 17. The positive electrode 19 contacts the diaphragm 13. However, the positive electrode 19 does not cover the entire surface 13a of the diaphragm 13 at the side opposite to the catalyst layer 14. Therefore, a portion of the surface 13a of the diaphragm 13 is exposed inside the positive-side cell 17. In FIG. 2, the positive-side cell 17, which is a vapor phase, is illustrated by a rectangle illustrating the outer edge of the drawing; however, the rectangle is not an actual component. This is similar for FIGS. 5 to 9 described below as well.

Thus, inside the housing 11, the positive electrode 19, the diaphragm 13, the catalyst layer 14, the diffusion layer 15, and the negative electrode 18 are stacked in this order and contact each other. The negative electrode 18 and the positive electrode 19 are connected to a power supply part (not illustrated), and a direct current voltage is supplied by the power supply part. The potential that is applied to the negative electrode 18 is less than that of the positive electrode 19.

A negative-side flow channel 21 through which a first raw material 91, which is a liquid, flows is formed inside the negative electrode 18. Many discharge apertures 22 are provided in the negative-side flow channel 21. The discharge apertures 22 contact the diffusion layer 15 of the isolation structure body 12 and discharge the first raw material 91 toward the diffusion layer 15. The negative-side flow channel 21 discharges the first raw material 91 toward the diaphragm because the diffusion layer 15 is located between the negative electrode 18 and the diaphragm 13.

The negative electrode 18 is configured so that many discharge apertures 22 are provided in one surface of the negative electrode 18, and the negative-side flow channel 21 is provided inside the negative electrode 18 to communicate with all of the discharge apertures 22. The discharge apertures 22 contact the diffusion layer 15. The negative electrode 18 contacts a portion of the surface 15a of the diffusion layer 15 but does not cover the remaining portion of the surface 15a. For example, the negative electrode 18 may be tree-shaped as shown in FIG. 3, but is not limited thereto.

An inflow port 23 is provided in the negative electrode 18. The first raw material 91 flows into the negative-side flow channel 21 through the inflow port 23. The total amount of the first raw material 91 that inflows through the inflow port 23 may outflow through the discharge apertures 22, or a portion of the first raw material 91 may outflow through the discharge apertures 22, and the remaining portion of the first raw material 91 may be discharged from the housing 11 and may be supplied to the inflow port 23 again via a pump, etc. The first raw material 91 that inflows through the inflow port 23 may outflow through the discharge apertures 22 while circulating through the negative electrode 18.

A positive-side flow channel 25 through which a second raw material 92, which is a liquid, flows is formed inside the positive electrode 19. Many discharge apertures 26 are provided in the positive-side flow channel 25. The discharge apertures 26 contact the diaphragm 13 of the isolation structure body 12 and discharge the second raw material 92 toward the diaphragm 13. For example, the configuration of the positive electrode 19 is similar to the configuration of the negative electrode 18.

An outflow port 31 is provided in the negative-side cell 16. For example, the outflow port 31 is provided in the bottom part of the negative-side cell 16. An outflow port 32 and an outflow port 33 are provided in the positive-side cell 17. For example, the outflow port 32 is provided in the upper part of the positive-side cell 17, and the outflow port 33 is provided in the bottom part of the positive-side cell 17.

An operation of the electrolytic device 1 according to the embodiment, i.e., an electrolysis method according to the embodiment, will now be described.

As shown in FIG. 1, a power supply part (not illustrated) supplies a direct current voltage between the negative electrode 18 and the positive electrode 19. At this time, the potential that is applied to the negative electrode 18 is less than that of the positive electrode 19. The first raw material 91 is supplied to the negative-side flow channel 21 inside the negative electrode 18 via the inflow port 23. The first raw material 91 is, for example, toluene ($C_6H_5CH_3$). The second raw material 92 is supplied to the positive-side flow channel 25 inside the positive electrode 19 via an inflow port (not illustrated). The second raw material 92 is, for example, water ($H_2O$).

As shown in FIG. 2, the first raw material 91 flows into the diffusion layer 15 from the negative-side flow channel 21 via the discharge apertures 22. Because the discharge apertures 22 contact the diffusion layer 15, the first raw material 91 penetrates the diffusion layer 15 substantially without outflowing into the negative-side cell 16. The first raw material 91 reaches the catalyst layer 14 by being diffused in all directions when passing through the diffusion layer 15.

On the other hand, the second raw material 92 is supplied to the diaphragm 13 from the positive-side flow channel 25 via the discharge apertures 26. Because the discharge apertures 26 contact the diaphragm 13, the second raw material 92 reaches the diaphragm 13 substantially without outflowing into the positive-side cell 17.

Because the voltage is applied between the positive electrode 19 and the negative electrode 18, the first raw material 91 (toluene) and the second raw material 92 (water) are electrolyzed at the vicinity of the catalyst layer 14 and react as shown in the following chemical formula. A first product 93 and a second product 94 are produced thereby. In the embodiment, the first product 93 is methylcyclohexane ($C_6H_{11}CH_3$), and the second product 94 is oxygen gas ($O_2$).

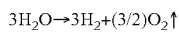

$$3H_2O \rightarrow 3H_2 + (3/2)O_2 \uparrow$$

$$C_6H_5CH_3 + 3H_2 \rightarrow C_6H_{11}CH_3$$

The first product 93 (methylcyclohexane) that is produced passes through the diffusion layer 15 and is discharged into the negative-side cell 16 through a region of the surface 15a that is not covered with the negative electrode 18. Thereby, the first product 93 is stored inside the negative-side cell 16. The first product 93 is discharged from the negative-side cell 16 via the outflow port 31 and is recovered.

On the other hand, the second product 94 (oxygen gas) that is produced is discharged into the positive-side cell 17 from a region of the surface 13a of the diaphragm 13 that is not covered with the positive electrode 19. Thereby, the second product 94 is stored inside the positive-side cell 17. The second product 94 is discharged from the positive-side cell 17 via the outflow port 32. The second product 94 may be recovered or may be discharged from the electrolytic device 1 and discarded. The portion of the second raw material 92 that is discharged from the positive-side flow channel 25 of the positive electrode 19 and sinks inside the positive-side cell 17 without being electrolyzed is discharged through the outflow port 33.

Thus, the first product 93 (methylcyclohexane) and the second product 94 (oxygen gas) are produced from the first raw material 91 (toluene) and the second raw material 92 (water) by the electrolytic device 1. In other words, electrical power can be converted into methylcyclohexane by the electrolytic device 1. Methylcyclohexane can be utilized as an organic hydride to store and transport hydrogen in the liquid state.

Effects of the embodiment will now be described.

In the embodiment, the first raw material 91 is supplied from the negative-side flow channel 21 to the catalyst layer 14 via the diffusion layer 15. Therefore, a high-purity first raw material 91 is supplied to the catalyst layer 14. The first product 93 that is produced inside the isolation structure body 12 is pushed from the isolation structure body 12 into the negative-side cell 16 by the pressure of the first raw material 91 discharged from the negative-side flow channel 21. Therefore, the obstruction of the electrolysis reaction by the first product 93 is suppressed.

Similarly, the second raw material 92 is supplied from the positive-side flow channel 25 to the diaphragm 13. Therefore, a high-purity second raw material 92 is supplied to the diaphragm 13. The second product 94 that is produced inside the isolation structure body 12 is pushed from the isolation structure body 12 into the positive-side cell 17 by the pressure of the second raw material 92 discharged from the positive-side flow channel 25. Therefore, the obstruction of the electrolysis reaction by the second product 94 is suppressed. As a result, in the electrolytic device 1 according to the embodiment, the efficiency of the electrolysis reaction described above is high.

Because the discharge apertures 22 of the negative-side flow channel 21 contact the diffusion layer 15, the first raw material 91 that is discharged through the discharge apertures 22 substantially does not outflow into the negative-side cell 16. Therefore, the purity of the first product 93 stored inside the negative-side cell 16 is high.

Because the discharge apertures 26 of the positive-side flow channel 25 contact the diaphragm 13, the second raw material 92 (water) is directly supplied from the discharge apertures 26 of the positive-side flow channel 25 into the diaphragm 13. The second product 94 (oxygen gas) that is produced inside the diaphragm 13 is pushed by the second raw material 92 (water) and released into the positive-side cell 17 through a region of the surface 13a of the diaphragm 13 that is not covered with the positive electrode 19. Bubbles of the second product 94 (oxygen gas) in the path of the second raw material 92 (water) can be suppressed thereby. Therefore, the impedance of the contact between the second raw material 92 and the diaphragm 13 by the bubbles of the second product 94 is low. The efficiency of the chemical reaction can be increased thereby.

Comparative Example

A comparative example will now be described.

Figure 4:
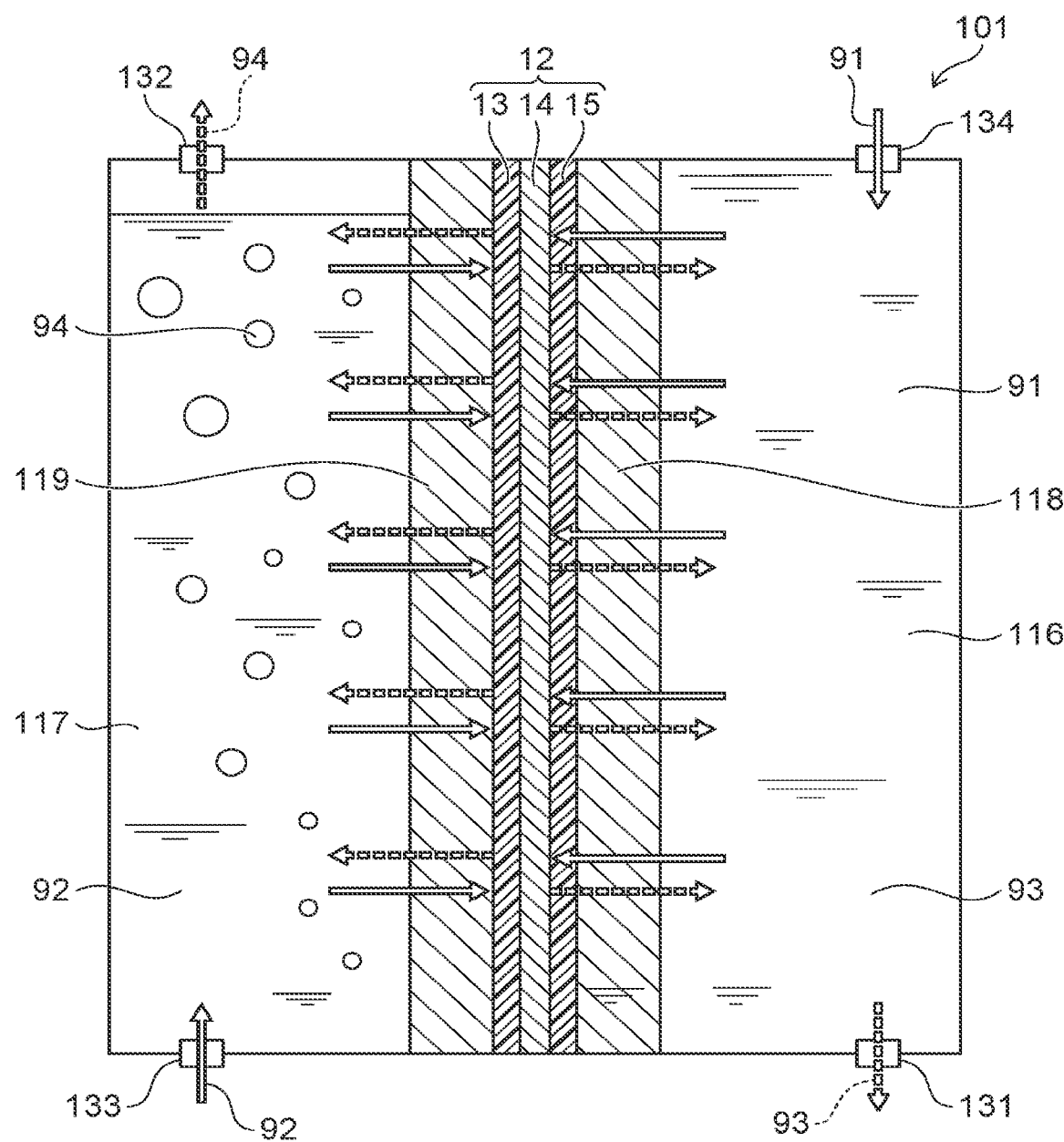
FIG. 4 shows an electrolytic device according to a comparative example.

FIG. 4 shows an electrolytic device according to a comparative example.

In the electrolytic device 101 according to the comparative example as shown in FIG. 4, a negative-side flow channel is not provided in a negative electrode 118, and a positive-side flow channel is not provided in a positive electrode 119. An inflow port 134 is provided in the upper part of a negative-side cell 116, and an outflow port 131 is provided in the bottom part of the negative-side cell 116. An outflow port 132 is provided in the upper part of a positive-side cell 117, and an inflow port 133 is provided in the bottom part of the positive-side cell 117.

In the electrolytic device 101, the first raw material 91 flows into the negative-side cell 116 via the inflow port 134, and the second raw material 92 flows into the positive-side cell 117 via the inflow port 133. Then, an electrolysis reaction occurs between the negative electrode 118 and the positive electrode 119; the first product 93 is produced inside the negative-side cell 116; and the second product 94 is produced inside the positive-side cell 117. The first product 93 is discharged from the negative-side cell 116 via the outflow port 131, and the second product 94 is discharged from the positive-side cell 117 via the outflow port 132.

In the negative-side cell 116 of the electrolytic device 101, the first raw material 91 that inflows through the inflow port 134 is changed little by little into the first product 93 by contacting the isolation structure body 12. Therefore, the unreacted first raw material 91 and the first product 93 that is produced coexist inside the negative-side cell 116. Accordingly, the first product 93 obstructs the contact between the unreacted first raw material 91 and the isolation structure body 12, and the efficiency of the electrolysis reaction decreases. In particular, the efficiency of the electrolysis decreases because the concentration of the first product 93 is high and the concentration of the first raw material 91 is low at the part of the negative-side cell 116 at the outflow port 131 side.

Similarly, in the positive-side cell 117 as well, the efficiency of the electrolysis reaction decreases because the unreacted second raw material 92 and the second product 94 that is produced coexist. Also, when the second product 94 is a gas (e.g., oxygen gas), there are cases where bubbles of the second product 94 undesirably cling to the positive electrode 119 and obstruct the contact of the second raw material 92 with the positive electrode 119. The efficiency of the electrolysis is reduced thereby.

Thus, in the electrolytic device 101, because the first raw material 91 and the second raw material 92 are not efficiently supplied to the isolation structure body 12, the efficiency of the electrolysis reaction is low, and the production efficiency of the first and second products 93 and 94 is low.

Conversely, according to the first embodiment described above, because a high-purity first raw material 91 and a high-purity second raw material 92 are constantly supplied to the isolation structure body 12, the efficiency of the electrolysis reaction is high, and the production efficiency of the first and second products 93 and 94 is high.

First Modification of First Embodiment

A first modification of the first embodiment will now be described.

Figure 5:
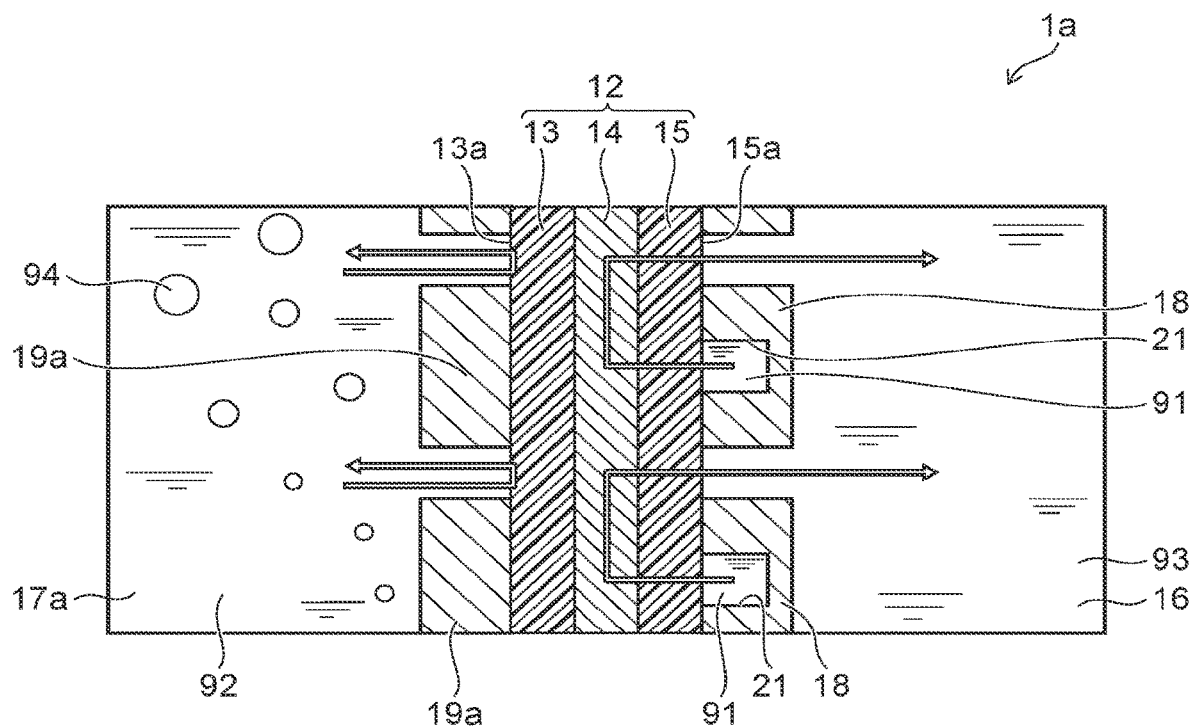
FIG. 5 is a partially enlarged cross-sectional view showing a diaphragm vicinity of an electrolytic device according to a first modification of the first embodiment.

FIG. 5 is a partially enlarged cross-sectional view showing a diaphragm vicinity of the electrolytic device according to the modification.

In the electrolytic device 1a according to the modification as shown in FIG. 5, the negative-side flow channel 21 is provided inside the negative electrode 18, but a positive-side flow channel is not provided inside a positive electrode 19a. In a positive-side cell 17a, the second raw material 92 is supplied via the inflow port 133 (referring to FIG. 4) provided in the housing 11 of the electrolytic cell 10 (referring to FIG. 1).

In the modification as well, effects similar to those of the first embodiment are obtained for the negative-side cell 16. When the reaction of the negative side is the rate-limiting reaction, the efficiency of the electrolysis reaction can be increased by the modification as well.

Also, when the second product 94 is a gas, the second product 94 can be quickly removed by a contrivance such that the second product 94 does not easily cling to the positive electrode 19a, and the second raw material 92 can be efficiently supplied to the isolation structure body 12. As a result, the reduction of the electrolysis reaction can be suppressed. For example, as the contrivance to suppress the clinging of the second product 94, it may be considered to strip the bubbles from the positive electrode 19a by forming a flow of the second raw material 92 inside the positive-side cell 17a, to use a shape of the positive electrode 19a to which the gas does not easily cling, to perform surface treatment of the positive electrode 19a so that the gas does not easily cling, etc. Otherwise, the configuration, the operations, and the effects of the modification are similar to those of the first embodiment.

Second Modification of First Embodiment

A second modification of the first embodiment will now be described.

Figure 6:
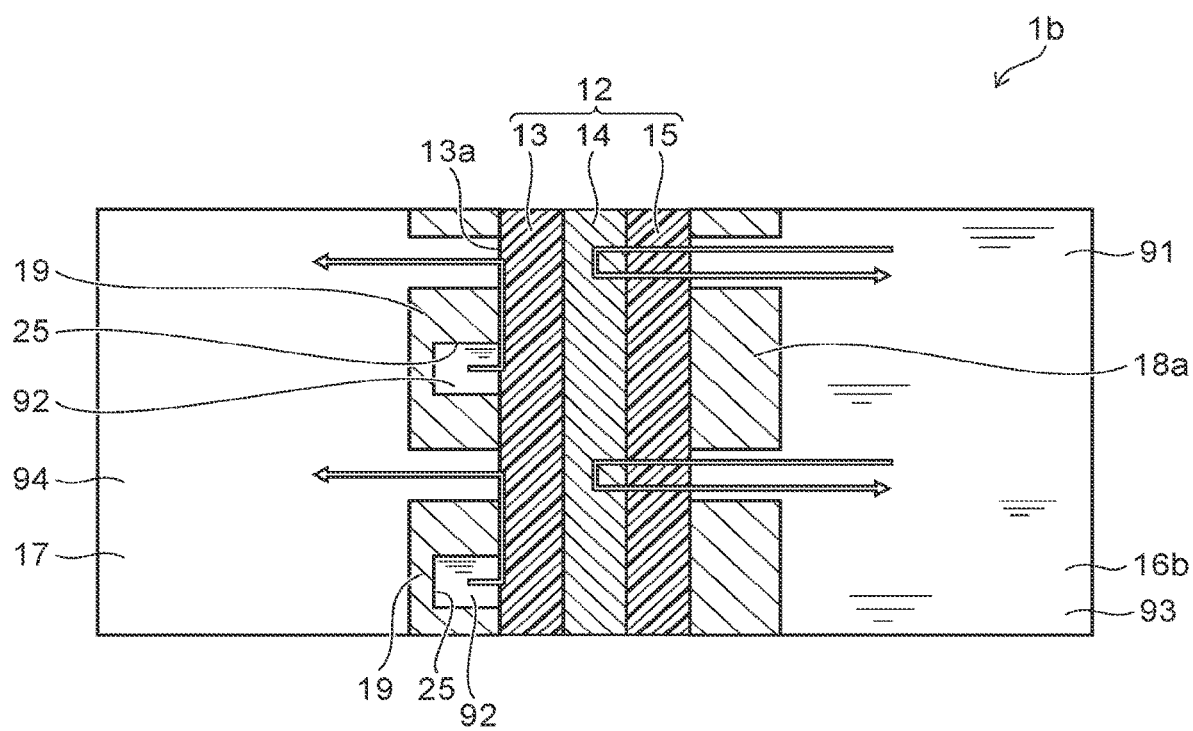
FIG. 6 is a partially enlarged cross-sectional view showing a diaphragm vicinity of an electrolytic device according to a second modification of the first embodiment.

FIG. 6 is a partially enlarged cross-sectional view showing a diaphragm vicinity of an electrolytic device according to the modification.

In the electrolytic device 1b according to the modification as shown in FIG. 6, the positive-side flow channel 25 is provided inside the positive electrode 19, but a negative-side flow channel is not provided inside a negative electrode 18b. In a negative-side cell 16b, the first raw material 91 is supplied via the inflow port 134 (referring to FIG. 4) provided in the housing 11 of the electrolytic cell 10 (referring to FIG. 1).

In the modification as well, effects similar to those of the first embodiment are obtained for the positive-side cell 17. When the reaction of the positive side is the rate-limiting reaction, the efficiency of the electrolysis reaction can be increased by the modification as well. Otherwise, the configuration, the operations, and the effects of the modification are similar to those of the first embodiment.

Second Embodiment

A second embodiment will now be described.

Figure 7:
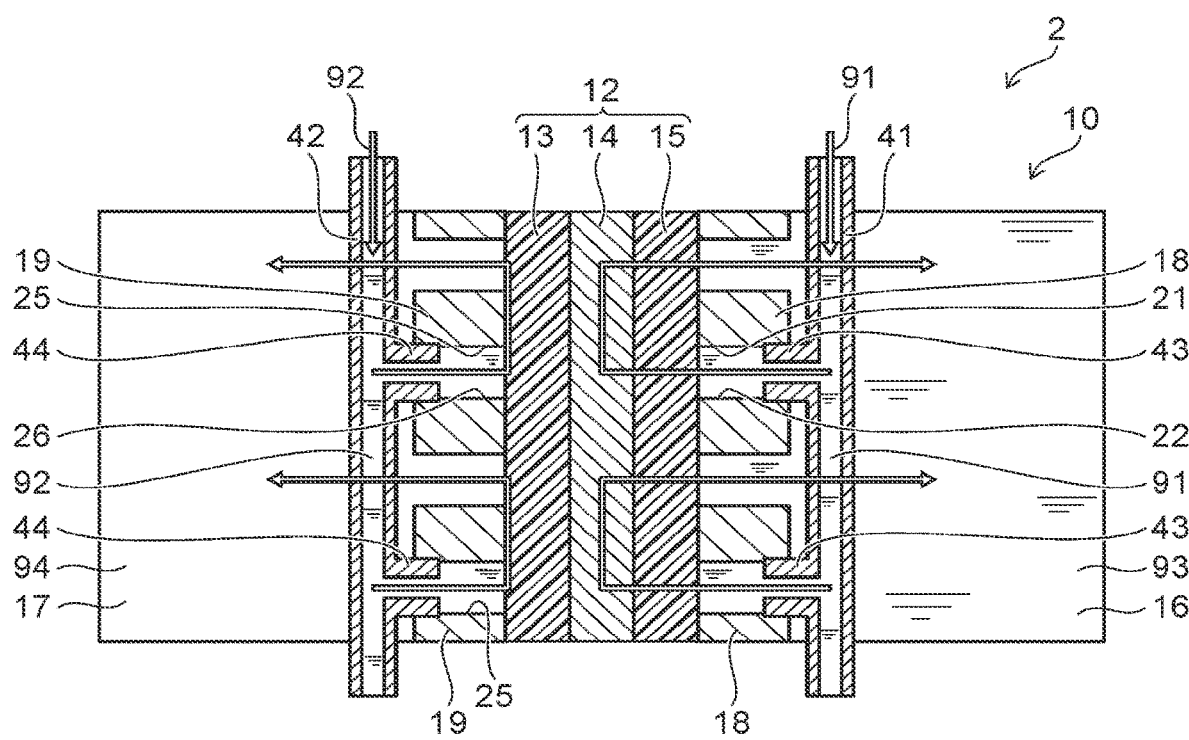
FIG. 7 is a partially enlarged cross-sectional view showing a diaphragm vicinity of an electrolytic device according to a second embodiment.

FIG. 7 is a partially enlarged cross-sectional view showing a diaphragm vicinity of an electrolytic device according to the embodiment.

As shown in FIG. 7, a negative-side raw material pipe 41 and a positive-side raw material pipe 42 are provided in the electrolytic device 2 according to the embodiment. The negative-side raw material pipe 41 is drawn into the negative-side cell 16 from outside the electrolytic cell 10. The negative-side raw material pipe 41 supplies the first raw material 91 to the negative-side flow channel 21. Specifically, the first raw material 91 flows through the negative-side raw material pipe 41, and multiple outflow ports 43 that supply the first raw material 91 to the negative-side flow channels 21 inside the negative electrode 18 are provided in the negative-side raw material pipe 41. In the embodiment, for example, the negative-side flow channel 21 has a shape such that the outflow ports 43 of the negative-side raw material pipe 41 and the discharge apertures 22 of the negative-side flow channel 21 are connected in straight lines. The inflow port 23 (referring to FIG. 1) is not provided in the negative-side flow channel 21.

Similarly, the positive-side raw material pipe 42 is drawn into the positive-side cell 17 from outside the electrolytic cell 10 (referring to FIG. 1). The positive-side raw material pipe 42 supplies the second raw material 92 to the positive-side flow channel 25. Specifically, the second raw material 92 flows through the positive-side raw material pipe 42, and multiple outflow ports 44 that supply the second raw material 92 to the positive-side flow channel 25 inside the positive electrode 19 are provided in the positive-side raw material pipe 42. In the embodiment, for example, the positive-side flow channel 25 has a shape such that the outflow ports 44 of the positive-side raw material pipe 42 and the discharge apertures 26 of the positive-side flow channel 25 are connected in straight lines. An inflow port is not provided in the positive-side flow channel 25.

According to the embodiment, by providing the negative-side raw material pipe 41 and the positive-side raw material pipe 42, the shapes of the negative-side flow channel 21 and the positive-side flow channel 25 can be simplified, and the configurations of the negative electrode 18 and the positive electrode 19 can be simplified. Otherwise, the configuration, the operations, and the effects of the embodiment are similar to those of the first embodiment.

First Modification of Second Embodiment

A first modification of the second embodiment will now be described.

Figure 8:
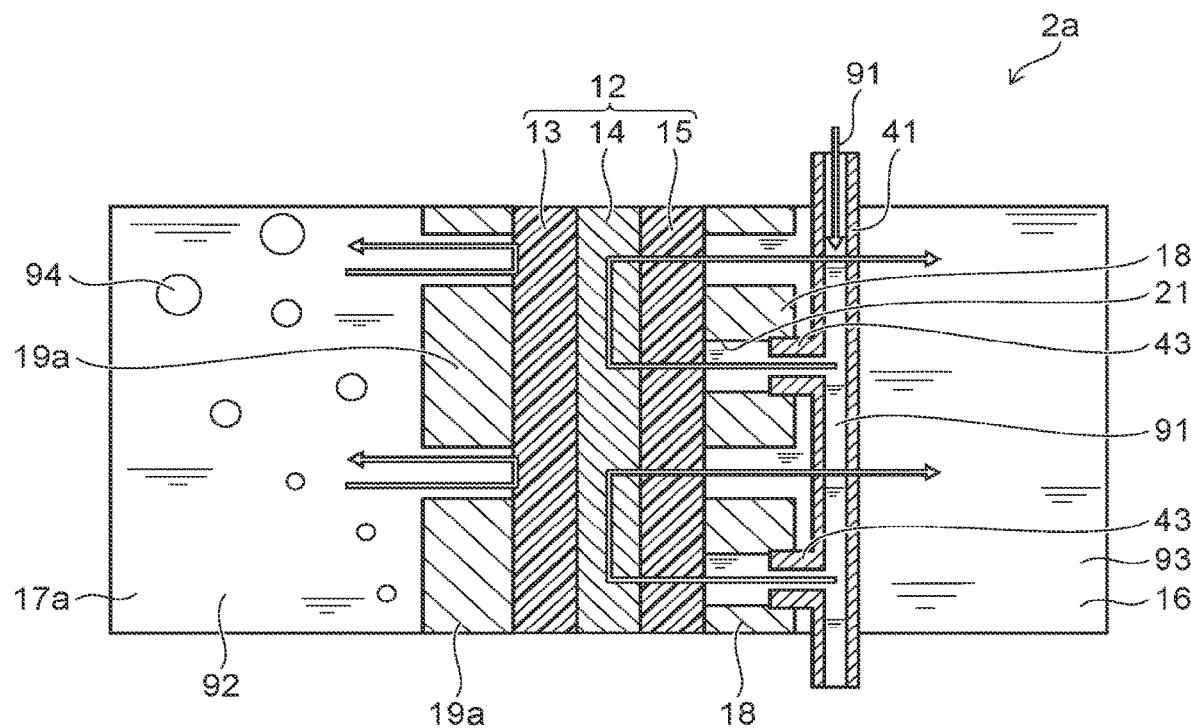
FIG. 8 is a partially enlarged cross-sectional view showing a diaphragm vicinity of an electrolytic device according to a first modification of the second embodiment.

FIG. 8 is a partially enlarged cross-sectional view showing a diaphragm vicinity of an electrolytic device according to the modification.

In the electrolytic device 2a according to the modification as shown in FIG. 8, the configuration of the negative side is similar to that of the second embodiment, and the configuration of the positive side is similar to that of the first modification of the first embodiment. In other words, the negative electrode 18 and the negative-side raw material pipe 41 are provided inside the negative-side cell 16, and the negative-side flow channel 21 is formed inside the negative electrode 18. The first raw material 91 is supplied to the diffusion layer 15 of the isolation structure body 12 via the negative-side raw material pipe 41 and the negative-side flow channel 21. On the other hand, the positive-side raw material pipe 42 is not provided inside the positive-side cell 17a, and the positive-side flow channel 25 is not formed inside the positive electrode 19a. The second raw material 92 is supplied to the diaphragm 13 of the isolation structure body 12 via the positive-side cell 17a.

In the modification as well, the efficiency of the electrolysis reaction can be increased when the reaction of the negative side is the rate-limiting reaction. Otherwise, the configuration, the operations, and the effects of the modification are similar to those of the second embodiment.

Second Modification of Second Embodiment

A second modification of the second embodiment will now be described.

Figure 9:
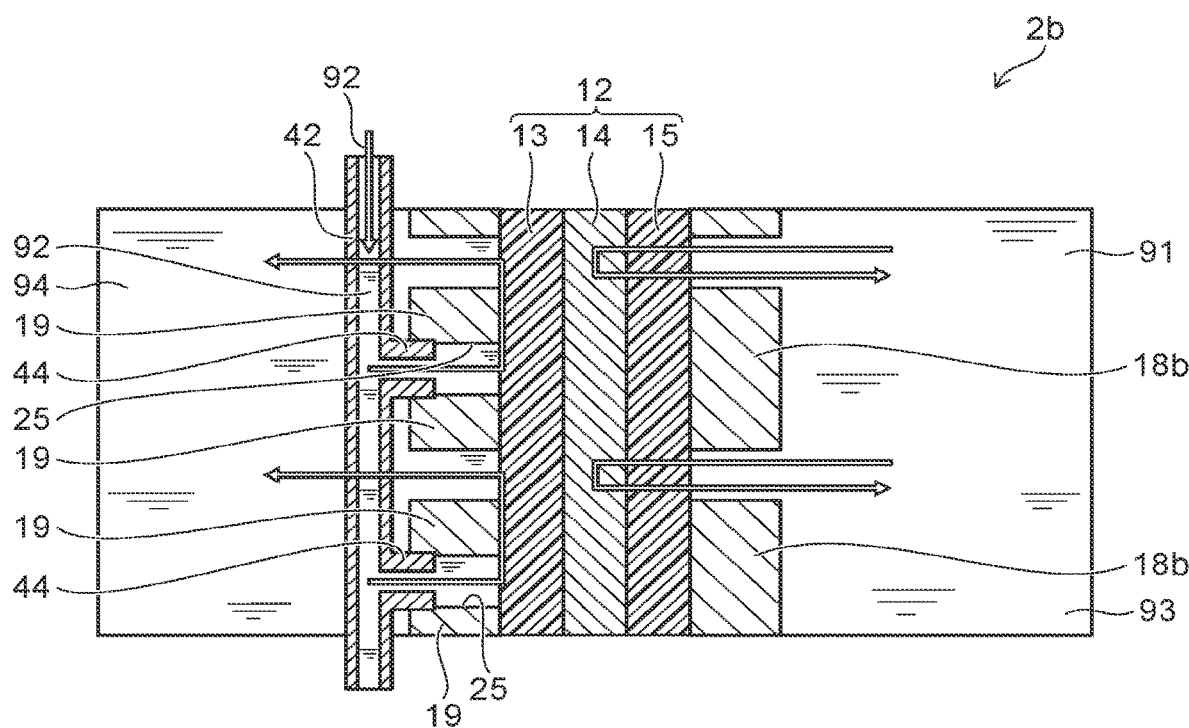
FIG. 9 is a partially enlarged cross-sectional view showing a diaphragm vicinity of an electrolytic device according to a second modification of the second embodiment.

FIG. 9 is a partially enlarged cross-sectional view showing a diaphragm vicinity of an electrolytic device according to the modification.

In the electrolytic device 2b according to the modification as shown in FIG. 9, the configuration of the positive side is similar to that of the second embodiment, and the configuration of the negative side is similar to that of the second modification of the first embodiment. In other words, the positive electrode 19 and the positive-side raw material pipe 42 are provided inside the positive-side cell 17, and the positive-side flow channel 25 is formed inside the positive electrode 19. The second raw material 92 is supplied to the diaphragm 13 of the isolation structure body 12 via the positive-side raw material pipe 42 and the positive-side flow channel 25. On the other hand, the negative-side raw material pipe 41 is not provided inside the negative-side cell 16b, and the negative-side flow channel 21 is not formed inside the negative electrode 18b. The first raw material 91 is supplied to the diffusion layer 15 of the isolation structure body 12 via the negative-side cell 16b.

In the modification as well, the efficiency of the electrolysis reaction can be increased when the reaction of the positive side is the rate-limiting reaction. Otherwise, the configuration, the operations, and the effects of the modification are similar to those of the second embodiment.

Third Embodiment

A third embodiment will now be described.

Figure 10:
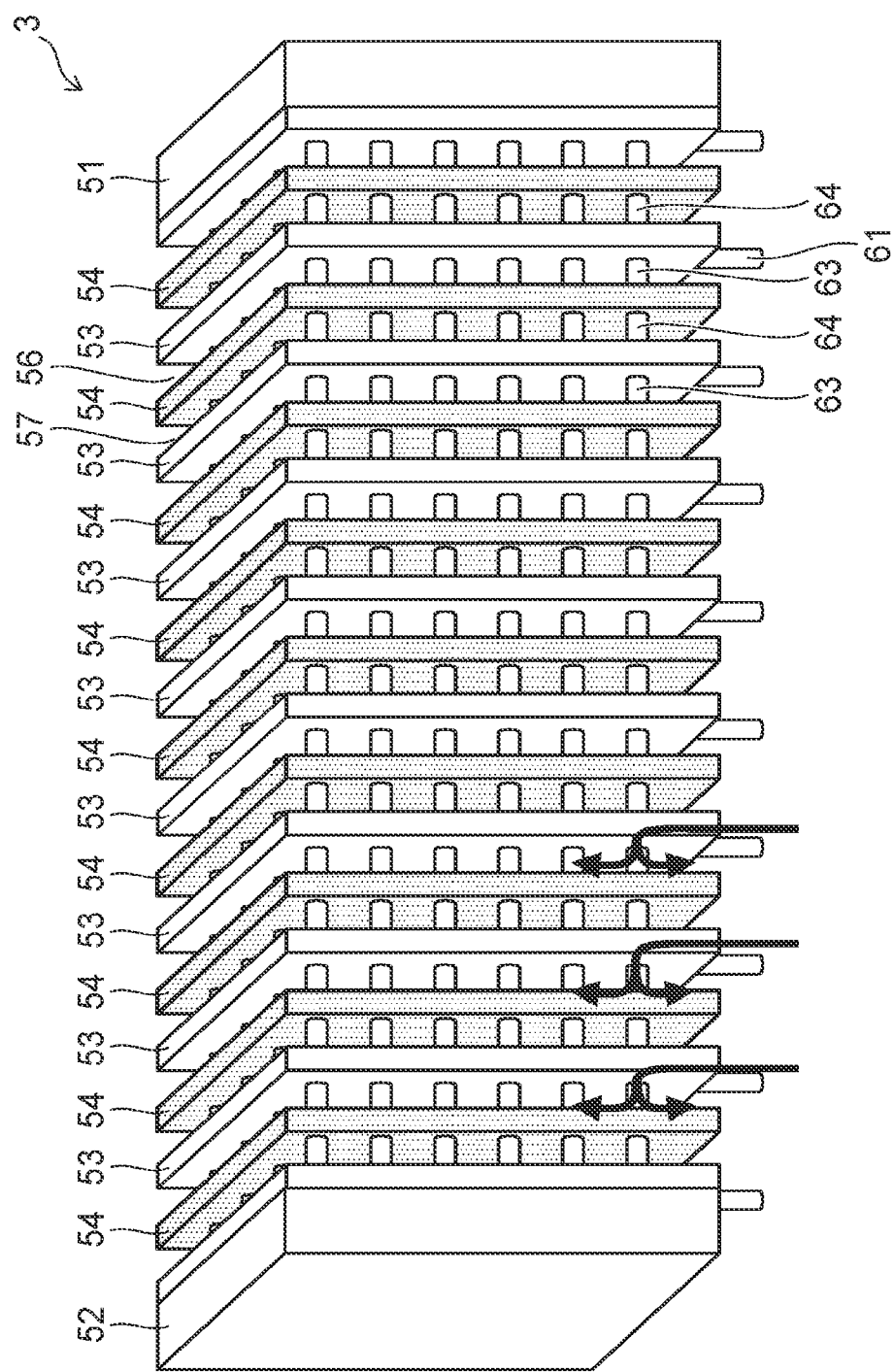
FIG. 10 is a perspective view showing an electrolytic device according to a third embodiment.

FIG. 10 is a perspective view showing an electrolytic device according to the embodiment.

Figure 11A:
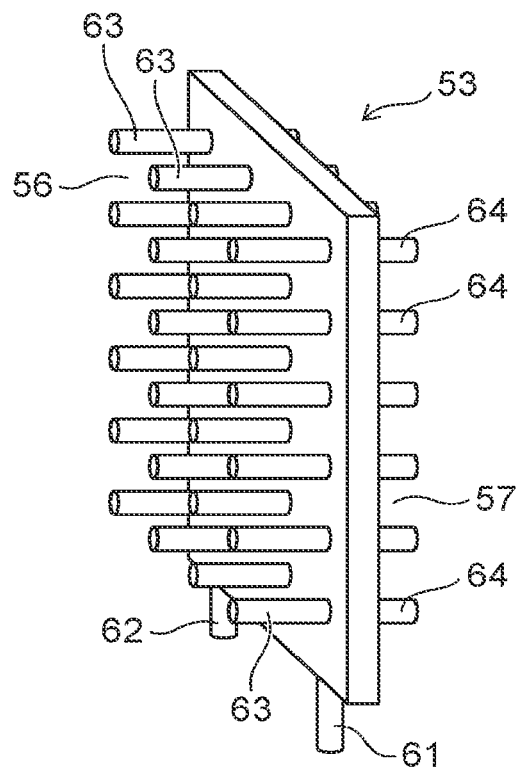
FIG. 11A is a perspective view showing a bipolar electrode of the electrolytic device according to the third embodiment.
Figure 11B:
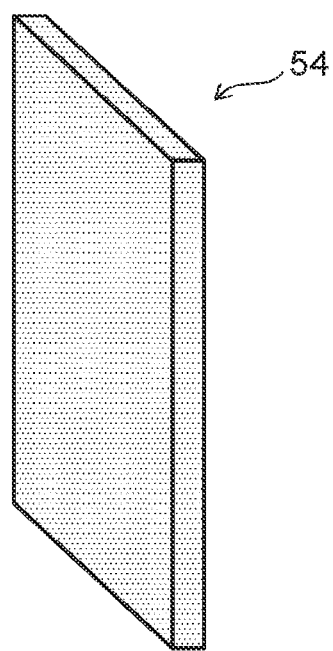
FIG. 11B is a perspective view showing an isolation structure body.

FIG. 11A is a perspective view showing a bipolar electrode of the electrolytic device according to the embodiment, and FIG. 11B is a perspective view showing an isolation structure body.

As shown in FIG. 10 and FIGS. 11A and 11B, a negative electrode 51 and a positive electrode 52 are provided in the electrolytic device 3 according to the embodiment. Multiple bipolar electrodes 53 and multiple isolation structure bodies 54 are alternately arranged, one at a time each, between the negative electrode 51 and the positive electrode 52. The multiple bipolar electrodes 53 and the multiple isolation structure bodies 54 are electrically connected in series between the negative electrode 51 and the positive electrode 52. The configurations of the isolation structure bodies 54 are similar to the configuration of the isolation structure body 12 of the first embodiment.

The bipolar electrode 53 is substantially plate-shaped. For example, one inflow port 61, one inflow port 62, multiple discharge apertures 63, and multiple discharge apertures 64 are provided in the bipolar electrode 53. The discharge apertures 63 are located at one surface of the bipolar electrode 53, and the discharge apertures 64 are located at another surface of the bipolar electrode 53. The inflow port 61 is connected to the discharge apertures 63 inside the bipolar electrode 53, and the inflow port 62 is connected to the discharge apertures 64 inside the bipolar electrode 53.

The discharge apertures 63 contact the diffusion layer 15 of the isolation structure body 54 (referring to FIG. 2), and the discharge apertures 64 contact the diaphragm 13 of the isolation structure body 54 (referring to FIG. 2). Among the spaces between the bipolar electrode 53 and the isolation structure bodies 54, the space in which the discharge apertures 63 are located is a negative-side cell 56, and the space in which the discharge apertures 64 are located is a positive-side cell 57.

By applying a direct current voltage between the negative electrode 51 and the positive electrode 52, a direct current voltage is applied to each isolation structure body 54 via the bipolar electrodes 53 at the two sides. In this state, the first raw material 91 inflows through the inflow port 61 into the bipolar electrode 53, is supplied to the diffusion layer 15 of the isolation structure body 54 through the discharge apertures 63, is changed into the first product 93 by an electrolysis reaction, and is discharged into the negative-side cell 56.

On the other hand, the second raw material 92 inflows through the inflow port 62 into the bipolar electrode 53, is supplied to the diaphragm 13 of the isolation structure body 54 through the discharge apertures 64, is changed into the second product 94 by an electrolysis reaction, and is discharged into the positive-side cell 57. Thus, the first product 93 and the second product 94 can be produced from the first raw material 91 and the second raw material 92.

According to the embodiment, the first product 93 and the second product 94 can be efficiently produced because the multiple negative-side cells 56 and the multiple positive-side cells 57 can be stacked compactly. Otherwise, the configuration, the operations, and the effects of the embodiment are similar to those of the first embodiment.

According to the embodiments described above, an electrolytic device and an electrolysis method can be realized in which the efficiency is high.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions. Additionally, the embodiments described above can be combined mutually.

What is claimed is:

1. An electrolytic device, comprising:
a first electrode;
a second electrode; and
a diaphragm provided between the first electrode and the second electrode,
a first flow channel being formed inside the first electrode, and
a plurality of first discharging apertures being formed in the first electrode and fluidically coupled with the first flow channel to discharge a first raw material toward the diaphragm,
the first raw material being a liquid.

2. The device according to claim 1, further comprising:
a diffusion layer provided between the first electrode and the diaphragm,
the plurality of first discharge apertures contacting the diffusion layer.

3. The device according to claim 2, further comprising:
a catalyst layer provided between the diffusion layer and the diaphragm.

4. The device according to claim 1, wherein
a second raw material is a liquid and is supplied to the diaphragm from the second electrode side, and
electrolysis is used to produce a first product from the first raw material and produce a second product from the second raw material.

5. The device according to claim 4, wherein
a second flow channel is formed inside the second electrode and discharges the second raw material toward the diaphragm.

6. The device according to claim 5, wherein
a discharge aperture of the second flow channel contacts the diaphragm.

7. The device according to claim 5, further comprising:
a second raw material pipe supplying the second raw material to the second flow channel.

8. The device according to claim 4, wherein
the first raw material is toluene,
the second raw material is water,
the first product is methylcyclohexane, and
the second product is oxygen.

9. An electrolysis method using an electrolytic device,
the electrolytic device including a first electrode, a second electrode, and a diaphragm provided between the first electrode and the second electrode,
a first flow channel being formed inside the first electrode, and
a plurality of first discharging apertures being formed in the first electrode and fluidically coupled with the first flow channel to discharge a first raw material toward the diaphragm,
the first raw material being a liquid,
a second raw material being a liquid and being supplied to the diaphragm from the second electrode side,
the method comprising:
using electrolysis to produce a first product from the first raw material and produce a second product from the second raw material.

10. The method according to claim 9, wherein
toluene is supplied as the first raw material,
water is supplied as the second raw material,
a voltage is applied between the first electrode and the second electrode,
methylcyclohexane is discharged as the first product, and
oxygen is discharged as the second product.

11. The device according to claim 1, further comprising:
a first raw material pipe supplying the first raw material to the first flow channel in the first electrode.

12. The device according to claim 1, further comprising:
the plurality of first discharging apertures being perpendicular to the first flow channel in the first electrode.

* * * * *